US009158061B2

(12) United States Patent
Kuo et al.

(10) Patent No.: US 9,158,061 B2
(45) Date of Patent: Oct. 13, 2015

(54) LIGHT SOURCE MODULE

(71) Applicant: Wistron Corporation, New Taipei (TW)

(72) Inventors: Yu-Ling Kuo, New Taipei (TW); Chen-Yu Li, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 14/251,654

(22) Filed: Apr. 14, 2014

(65) Prior Publication Data

US 2015/0185412 A1 Jul. 2, 2015

(30) Foreign Application Priority Data

Dec. 30, 2013 (TW) .............................. 102149055 U

(51) Int. Cl.
*F21V 7/04* (2006.01)
*F21V 8/00* (2006.01)

(52) U.S. Cl.
CPC .................... *G02B 6/0096* (2013.01)

(58) Field of Classification Search
CPC ............. G02B 6/2817; G02B 6/29368; G02B 2006/1215; G02B 27/126; G02B 6/0005; G02B 6/0006; G02B 6/12002; G02B 6/26; G02B 2/2804; G02B 6/3878; G02B 6/4214; G02B 6/2821; G02B 6/2848; G02B 2006/12004; G02B 2006/12104; G02B 6/125; G02B 6/2852; G02B 6/29332; F21S 10/005
USPC ......... 362/543–545, 553–555, 558, 564–568, 362/570, 800, 615, 616; 385/15, 27, 28, 31, 385/34, 41, 42, 45–47, 50; 235/462.01, 235/462.2, 462.22
See application file for complete search history.

(56) References Cited

U.S. PATENT DOCUMENTS

| 4,176,908 | A | * | 12/1979 | Wagner | 385/47 |
| 4,306,765 | A | * | 12/1981 | Winzer et al. | 385/47 |
| 4,472,020 | A | * | 9/1984 | Evanchuk | 385/14 |
| 5,195,162 | A | * | 3/1993 | Sultan et al. | 385/130 |
| 5,517,390 | A | * | 5/1996 | Zins | 362/568 |
| 5,781,678 | A | * | 7/1998 | Sano et al. | 385/45 |
| 6,519,382 | B1 | * | 2/2003 | Jurbergs et al. | 385/18 |

(Continued)

FOREIGN PATENT DOCUMENTS

| TW | M355386 | 4/2009 |
| TW | 201306700 | 2/2013 |

(Continued)

OTHER PUBLICATIONS

"Office Action of Taiwan Counterpart Application", issued on Jun. 12, 2015, with English translation thereof, p1-p4, in which the listed foreign reference was cited.

*Primary Examiner* — Hargobind S Sawhney
(74) *Attorney, Agent, or Firm* — Jianq Chyun IP Office

(57) ABSTRACT

A light source module including a light guide and a light source is provided. An end of the light guide has a light incident surface, and the other end of the light guide has at least three light-guiding branches. The light-guiding branches respectively extend along different extending directions and each light-guiding branch has a light emitting surface. The light source is adapted for providing a light beam, wherein the light beam enters the light guide through the light incident surface and the light beam exits the light guide from the light emitting surfaces.

10 Claims, 9 Drawing Sheets

(56) References Cited

U.S. PATENT DOCUMENTS

| | | | |
|---|---|---|---|
| 6,888,981 B2 * | 5/2005 | Blake et al. | 385/27 |
| 7,080,931 B2 * | 7/2006 | Kao | 362/567 |
| 7,092,588 B2 * | 8/2006 | Kondo | 385/14 |
| 7,106,921 B2 * | 9/2006 | Iwamori et al. | 385/14 |
| 8,181,877 B2 * | 5/2012 | Barsotti | 235/462.2 |
| 8,542,961 B2 * | 9/2013 | Kuo et al. | 385/32 |
| 8,737,785 B2 * | 5/2014 | Kuo et al. | 385/50 |
| 2011/0279039 A1 * | 11/2011 | Kishimoto | 315/113 |
| 2013/0027973 A1 | 1/2013 | Huang | |
| 2014/0218972 A1 | 8/2014 | Lin et al. | |

FOREIGN PATENT DOCUMENTS

| | | |
|---|---|---|
| TW | M455170 | 6/2013 |
| TW | I409412 | 9/2013 |

* cited by examiner

_US 9,158,061 B2_

LIGHT SOURCE MODULE

CROSS-REFERENCE TO RELATED APPLICATION

This application claims the priority benefit of Taiwan application serial no. 102149055, filed on Dec. 30, 2013. The entirety of the above-mentioned patent application is hereby incorporated by reference herein and made a part of this specification.

BACKGROUND OF THE INVENTION

1. Field of the Invention

The invention generally relates to a light source module, and more particularly to a light source module having a plurality of light-guiding branches.

2. Description of Related Art

In recent years, light-emitting efficiency and service life of light-emitting diode (LED) are enhanced, and since the LED has device features and advantages of low power consumption, low pollution, high efficiency, high response speed, small volume, light weight and capable of being disposed on various surfaces, the LEDs are widely used in various optical fields. Taking the application of the LED in illumination as an example, applications of applying LED packages in light sources (for example, lamps, street light, flashlights, etc.) or related illumination equipment have been developed.

In general, since the LED is a directional light source, it is required to incorporate the design of disposing a light guide in order to allow the light emits from a light source module to fulfill the design requirements of intensity and illuminating axis. However, since the optical pathway design of the light guide of the light source module is mainly to allow the light to exit from the same plane and each light emitting plane is required to have light guide design such that each light emitting plane is accompanied by a light source and a light guide, the power consumption in such configuration is higher. Moreover, in existing light source module design, the light source module is required to add a plurality of epitaxial on the light source to allow the light to exit from different planes. As a result, the manufacturing cost is also increased.

SUMMARY OF THE INVENTION

The invention provides a light source module which allows the light to exit along different axes while having advantages of small volume and low power consumption.

The invention provides a light source module including a light guide and a light source. An end of the light guide has a light incident surface, and the other end of the light guide has at least three light-guiding branches. The light-guiding branches respectively extend along different extending directions and each light-guiding branch has a light emitting surface. The light source is adapted for providing a light beam such that the light beam enters the light guide through the light incident surface and the light beam exits the light guide from the light emitting surfaces.

In an embodiment of the invention, the light-guiding branches include a first light-guiding branch, a second light-guiding branch, and a third light-guiding branch. The first light-guiding branch extends along a first direction, the second light-guiding branch extends along a second direction, and the third light-guiding branch extends along a third direction. The first direction and the second direction are located on a plane, the light guide has a light scattering portion, and the light scattering portion and the third light-guiding branch are respectively located on both sides of the plane.

In an embodiment of the invention, the light scattering portion is disposed on a connection of the first light-guiding branch and the second light-guiding branch.

In an embodiment of the invention, the main body, the light scattering portion, the first light-guiding branch, the second light-guiding branch, and the third light-guiding branch are integrally formed.

In an embodiment of the invention, the light scattering portion has a recess, the recess extends toward the third light-guiding branch, and part of the light beam is scattered by the recess and transmits to the third light-guiding branch along the third direction.

In an embodiment of the invention, a projection of a top portion of the recess on a plane falls outside of a projection region in which the third light-guiding branch projects on the plane, and the plane is parallel to the first direction and the second direction.

In an embodiment of the invention, the recess is a hemispherical recess, conical recess, quarter of spherical recess, or half conical recess.

In an embodiment of the invention, a bottom surface of the recess includes a polished surface.

In an embodiment of the invention, a bottom surface of the recess includes a rough surface.

In an embodiment of the invention, the first direction, the second direction, and the third direction are not parallel to each other.

In an embodiment of the invention, the first direction, the second direction, and the third direction are perpendicular to each other.

Accordingly, by disposing the light guide that has at least three light-guiding branches, the light source module of the invention allows light to exit along a plurality of different axes even when only one light source is provided. Therefore, when performing optical design, the amount of light sources can be reduced to achieve the advantages of small volume and low power consumption.

To make the above features and advantages of the invention more comprehensible, several embodiments accompanied with drawings are described in detail as follows.

DESCRIPTION OF THE EMBODIMENTS

Figure 1A:
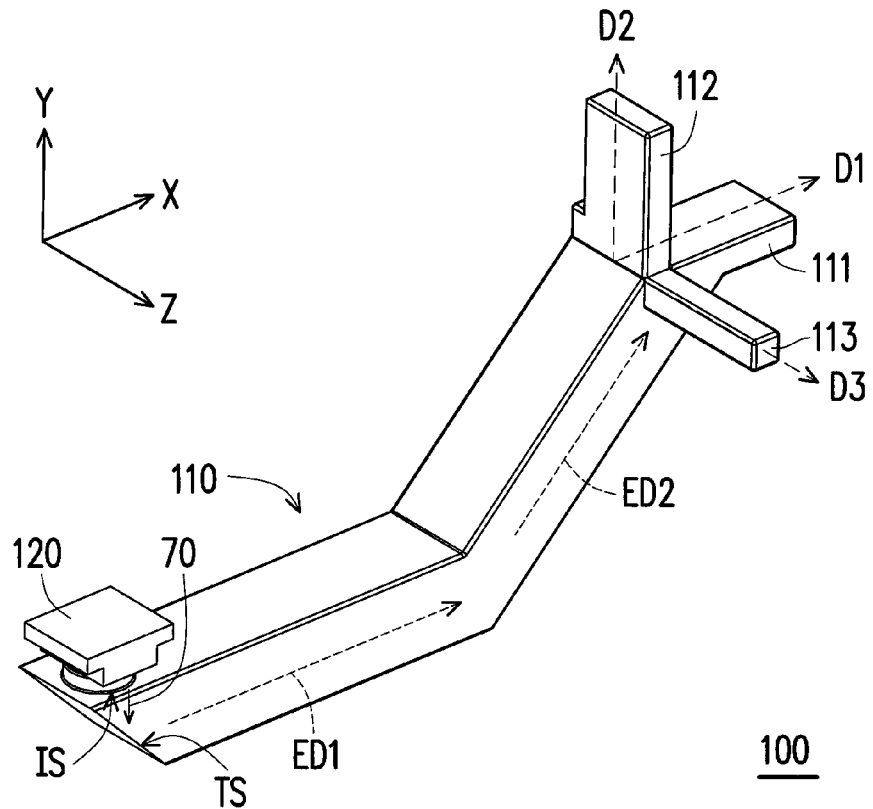
FIG. 1A is a schematic three-dimensional view of one perspective of a light source module according to an embodiment of the invention.
Figure 1B:
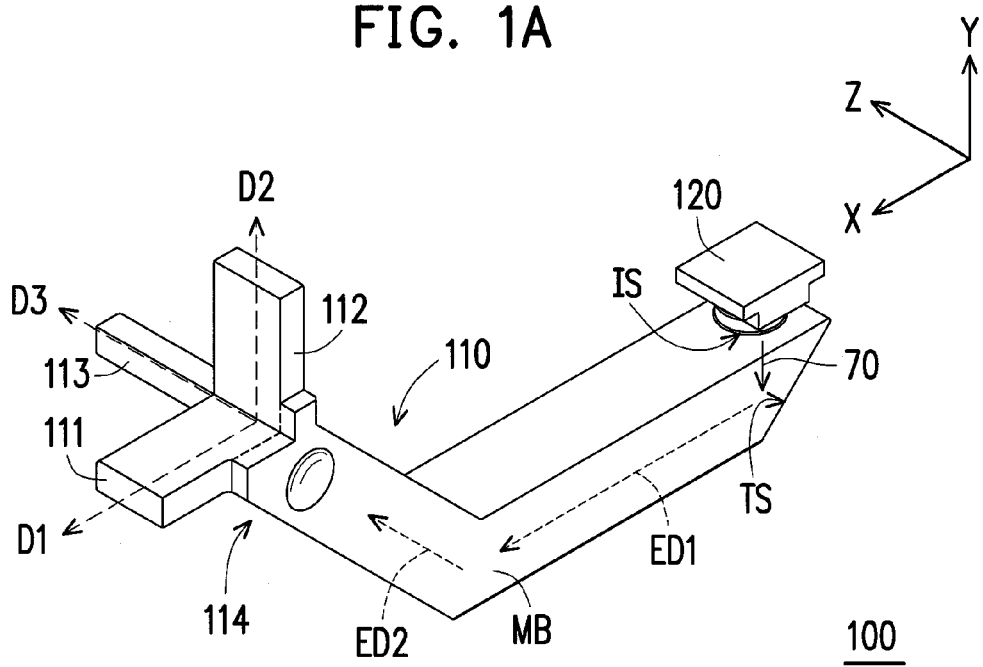
FIG. 1B is a schematic three-dimensional view of another perspective of the light source module in FIG. 1A.

FIG. 1A is a schematic three-dimensional view of one perspective of a light source module according to an embodiment of the invention. FIG. 1B is a schematic three-dimensional view of another perspective of the light source module in FIG. 1A. Referring to FIG. 1A and FIG. 1B, a light source module 100 includes a light guide 110 and a light source 120. Specifically, in the present embodiment, an end of the light guide 110 has a light incident surface IS, and the other end of the light guide 110 has at least three light-guiding branches 111, 112, and 113. The light-guiding branches 111, 112, and 113 respectively extend along different extending directions, and each light-guiding branch respectively has a light emitting surface ES1, ES2, or ES3. For example, in the present embodiment, light-guiding branches include a first light-guiding branch 111, a second light-guiding branch 112, and a third light-guiding branch 113. The first light-guiding branch 111 extends along a first direction D1, the second light-guiding branch 112 extends along a second direction D2, and the third light-guiding branch 113 extends along a third direction D3. In the present embodiment, the first direction D1 and the second direction D2 are located on a plane DP and are not parallel to each other. The plane DP is, for example, parallel to X-Y plane, but the invention is not limited thereto. On the other hand, in the present embodiment, the third direction D3 is, for example, perpendicular to X-Y plane and is parallel to Z direction. In other words, the first direction D1, the second direction D2, and the third direction D3 are not parallel to each other. More specifically, in the present embodiment, the first direction D1 is, for example, parallel to X direction, the second direction D2 is, for example, parallel to Y direction. Therefore, the first direction D1, the second direction D2, and the third direction D3 are perpendicular to each other, but the invention is not limited thereto.

Specifically, in the present embodiment, the light source 120 is adapted for providing a light beam 70. For example, light source 120 is an LED, but the invention is not limited thereto. Further explanations accompanied by FIG. 2A to FIG. 2D regarding light path of the light beam 70 in the light guide 110 will be provided below.

Figure 2A:
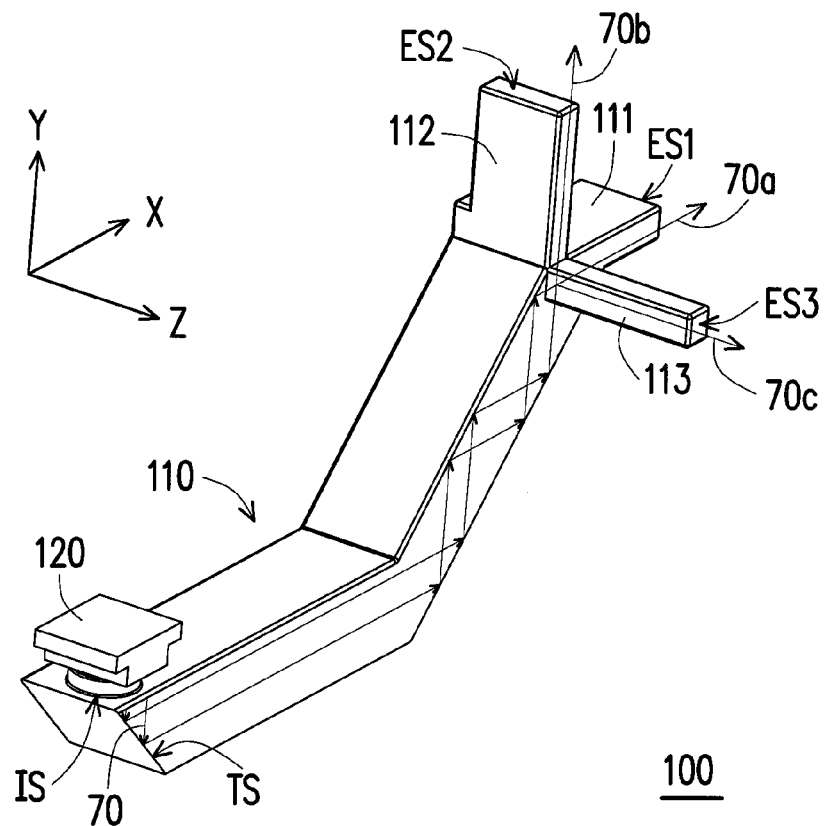
FIG. 2A is a schematic view of light path of a light guide in FIG. 1.
Figure 2B:
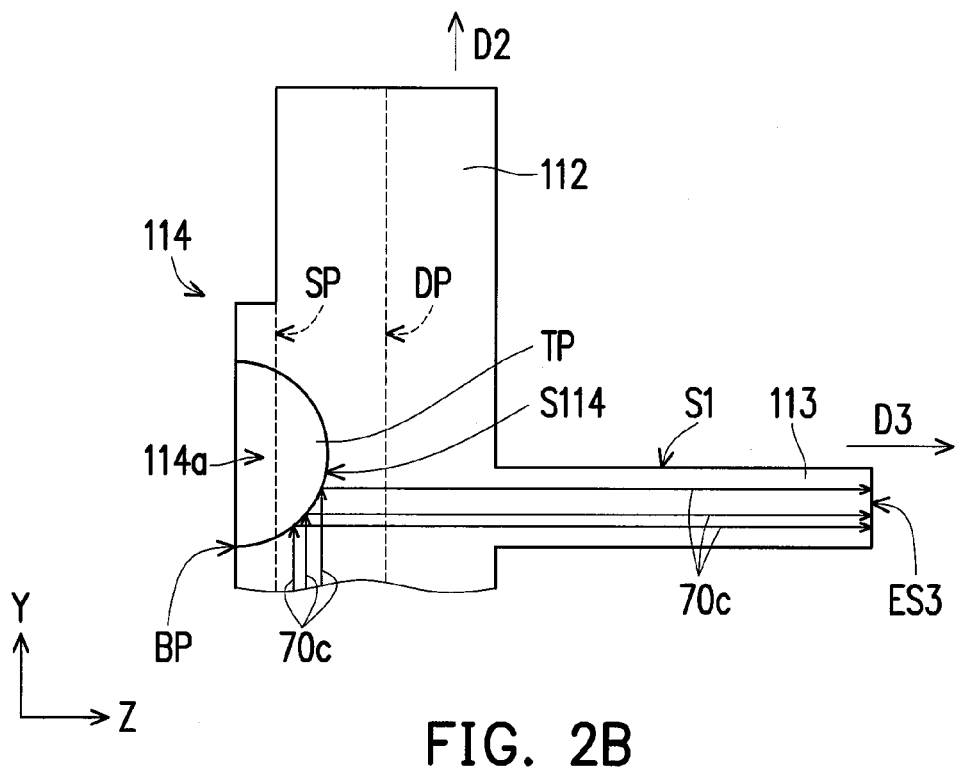
FIG. 2B is a schematic view of light path of part of the light beam exiting through a third light-guiding branch in FIG. 2A.

FIG. 2A is a schematic view of light path of a light guide in FIG. 1. FIG. 2B is a schematic view of light path of part of the light beam exiting through a third light-guiding branch in FIG. 2A. Referring to FIG. 1B and FIG. 2A, when the light source 120 illuminates, the light beam 70 enters the light guide 110 through the light incident surface IS, and the light beam 70 is capable of exiting the light guide 110 through these light emitting surfaces ES1, ES2, and ES3. More specifically, in the present embodiment, the light guide 110 has a first extending direction ED1 and a second extending direction ED2. For example, as shown in FIG. 1B, in the present embodiment, an angle between the light incident surface IS and terminal surface TS falls in the range of 40 degree to 50 degree, an angle between the first extending direction ED1 and the second extending direction ED2 falls in the range of 130 degree to 140 degree, angle between the second extending direction ED2 and the first direction D1 and angle between the second extending direction ED2 and the second direction D2 all fall in the range of 130 degree to 140 degree, and an angle between the second extending direction ED2 and the third direction D3 falls in the range of 85 degree to 95 degree. As such, as shown in FIG. 2A, after the light beam 70 enters the light guide 110, it will be reflected by a terminal surface TS of the light guide 110 and transmits along the first extending direction ED1 and the second extending direction ED2 in sequence within the light guide 110 and behaves in total reflection manner while travelling to each of the light-guiding branches 111, 112, and 113 before exiting. It is worth to note that the aforementioned parameters are only examples for explanation, and the invention is not limited thereto.

Furthermore, as shown in FIG. 1B and FIG. 2B, in the present embodiment, the light guide 110 further includes a main body MB and a light scattering portion 114. The light scattering portion 114 and the third light-guiding branch 113 are respectively located on both sides of the plane DP, and the light scattering portion 114 is disposed next to a connection of the first light-guiding branch 111 and the second light-guiding branch 112. As shown in FIG. 1B, in the present embodiment, the main body MB, the light scattering portion 114, and each of the light-guiding branches 111, 112, and 113 of the light guide 110 are integrally formed. For example, the method of forming the light guide 110 can be through injection molding to form desired shape, but the invention is not limited thereto.

More specifically, as shown in FIG. 2B, in the present embodiment, the light scattering portion 114 has a recess 114a, and the recess 114a extends toward the third light-guiding branch 113. In the present embodiment, the recess 114a is a hemispherical recess. In other words, a bottom surface S114 of the recess 114a is a hemispherical surface, and part of the bottom surface S114 of the recess 114a would cross a plane SP (i.e. the bottom surface S114 of the recess 114a intersects the plane SP) in which the first light-guiding branch 111, the second light-guiding branch 112, and the light scattering portion 114 connects. Therefore, it allows the bottom surface S114 of the recess 114a to locate on the transmitting path of part of the light beam 70c. After the light beam 70 enters the light guide 110 and transmits to the connection of the main body MB and each light-guiding branches 111, 112, and 113 of the light guide 110 along the first extending direction ED1 and the second extending direction ED2, the light beam 70c would be scattered by the recess 114a and transmits to the third light-guiding branch 113 along the third direction D3. Then, the light beam 70c exits the light guide 110 through light emitting surface ES3 of the third light-guiding branch 113.

Figure 2C:
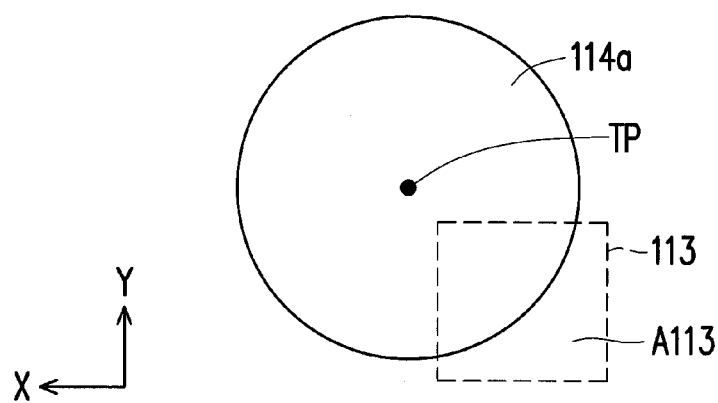
FIG. 2C is a schematic view of a projection region of a recess and the third light-guiding branch on a plane in FIG. 2A.

FIG. 2C is a schematic view of a projection region of a recess and the third light-guiding branch on a plane in FIG. 2A. Moreover, as shown in FIG. 2B and FIG. 2C, in the present embodiment, the projection of a top portion TP of the recess 114a (i.e. center of the bottom surface S114 of the recess 114a) on the X-Y plane would fall outside of a projection region A113 in which the third light-guiding branch 113 projects on the X-Y plane. Furthermore, as shown in FIG. 2B, the distance of the top portion TP of the recess 114a to a boarder BP of the recess 114a in the second direction D2 is larger than the width between a surface S1 of the third light-guiding branch 113 and the boarder BP of the recess 114a in the second direction D2. As such, the light beam 70c can be scattered by the recess 114a more efficiently and exits through the light emitting surface ES3 of the third light-guiding branch 113. In addition, the bottom surface S114 of the recess 114a can undergo treatments such as polishing, texturing, or matting to allow the light beam 70c which exits through the light emitting surface ES3 of the third light-guiding branch 113 to render an excellent uniformity. For example, in the present embodiment, the bottom surface S114 of the recess 114a can include a polished surface or a rough surface (matte surface).

Figure 2D:
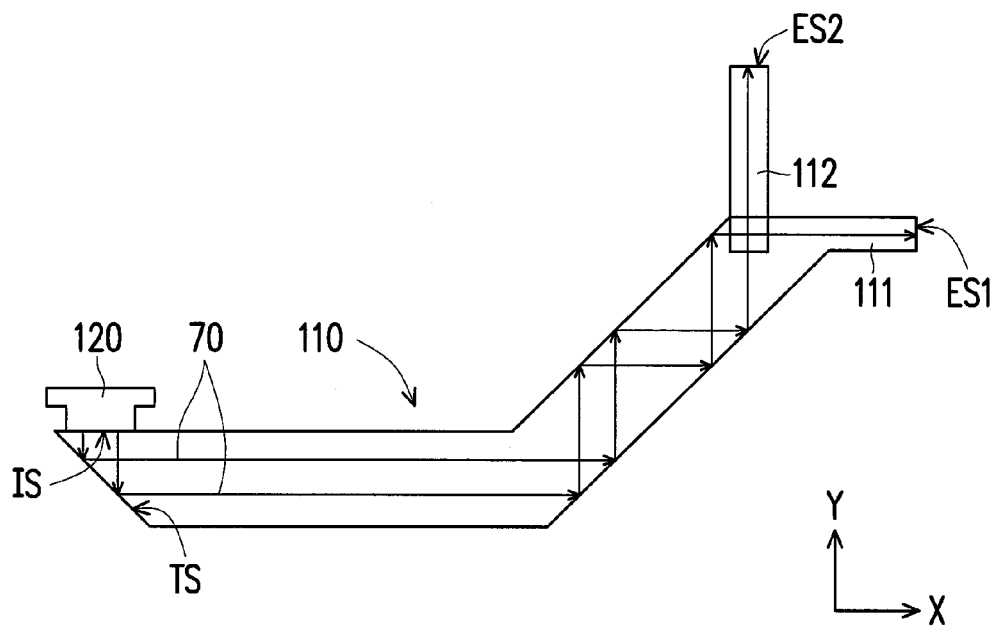
FIG. 2D is a schematic view of light path of part of the light beam exiting through a first light-guiding branch and a second light-guiding branch in FIG. 2A.

FIG. 2D is a schematic view of light path of part of the light beam exiting through a first light-guiding branch and a second light-guiding branch in FIG. 2A. On the other hand, as shown in FIG. 2A and FIG. 2D, other parts of the light beam 70a and 70b that are not scattered by the recess 114a of the light scattering portion 114 can be directly guided to the first light-guiding branch 111 and the second light-guiding branch 112, and then exit through the light emitting surfaces ES1 and ES2 of the first light-guiding branch 111 and the second light-guiding branch 112.

Furthermore, referring to FIG. 2A again, in the present embodiment, the path in which the light bean 70 enters the light guide 110 is not coplanar in space with the path in which at least one of the light beams 70a, 70b and 70c exit the light guide 110, and the paths are skew lines. For example, as shown in FIG. 2A, the path in which the light beam 70 enters the light guide 110 does not intersect (ie. not coplanar) the path in which the light beam 70c exits the light guide 110. The paths are neither parallel nor perpendicular and the paths appear in skew lines conditions. Moreover, in the present embodiment, at least two of the paths in which the light beams 70a, 70b, and 70c exit the light guide 110 do not parallel with each other in space. In other words, light source module 100 is capable of achieving the effect such that the lights exit the module from light emitting surfaces ES1, ES2, and ES3 not parallel with each other when the module only include one light source 120.

In this way, the light source module 100 is capable of changing the axis in which the light exits through the structural design of having at least three light-guiding branches 111, 112, and 113 to achieve the multi-axis light exiting purpose. Moreover, since the light source module 100 is capable of achieving the effect such that the lights exits the module from light emitting surfaces ES1, ES2, and ES3 not parallel with each other with only one light source 120, during the optical design of the light source 100, the amount of light sources can be reduced and the light source 100 would have advantages of small volume and low power consumption under the consideration of not increasing the design cost.

In addition, it should be illustrated that although the aforementioned light guide 110 having the first extending direction ED1 and the second extending direction ED2 while the first light-guiding branch 111, the second light-guiding branch 112, and the third light-guiding branch 113 of the light guide 110 respectively extend along the first direction D1, the second direction D2, and the third direction D3 are used as an example, the invention is not limited thereto. In other embodiments, the light guide 110 can also have a main extending direction or a plurality of different extending directions while each of the light branches 111, 112, and 113 of the light guide 110 having different extending directions, but the invention is not limited thereto. In other words, the invention does not limit the form in which the light guide 110 extends, and in other embodiment, the light guide 110 is suitable as the light guide 110 in the present embodiment as long as the light guide 110 has a plurality of light branches 111, 112, and 113 to split the light in order to achieve the multi-axis light exiting function.

Moreover, although the hemispherical recess 114a is used as an example for the aforementioned recess 114a of the light scattering portion 114, the invention is not limited thereto. In other embodiments, the recess 114a of the light scattering portion 114 can include other shapes, and further explanations accompanied by FIG. 3A to FIG. 5C will be provided below.

Figure 3A:
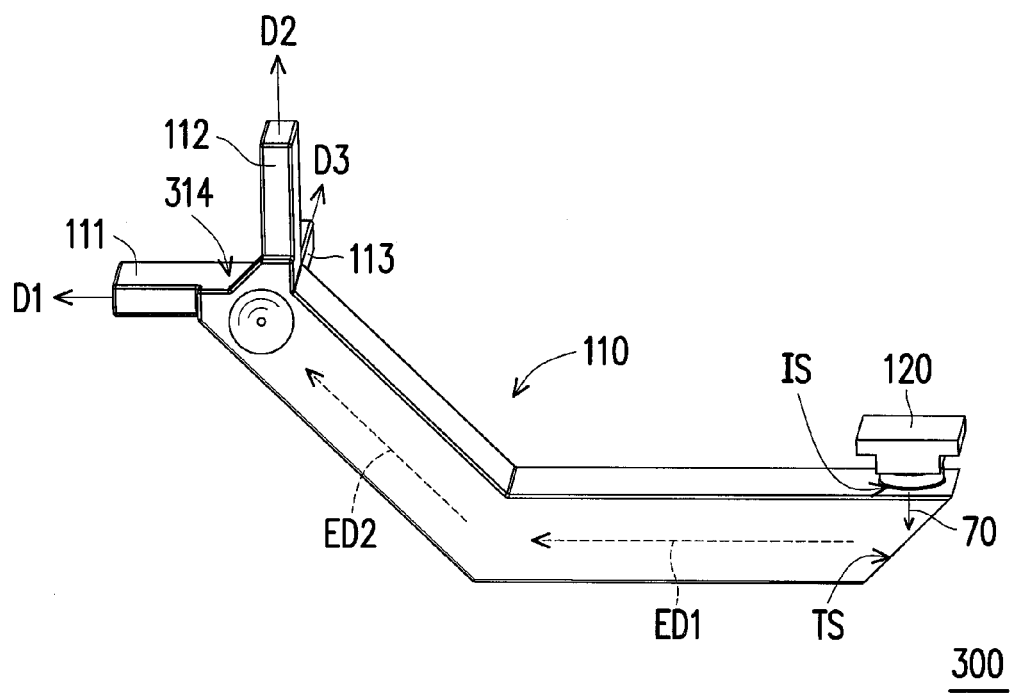
FIG. 3A is a schematic three-dimensional view of one perspective of a light source module according to another embodiment of the invention.
Figure 3B:
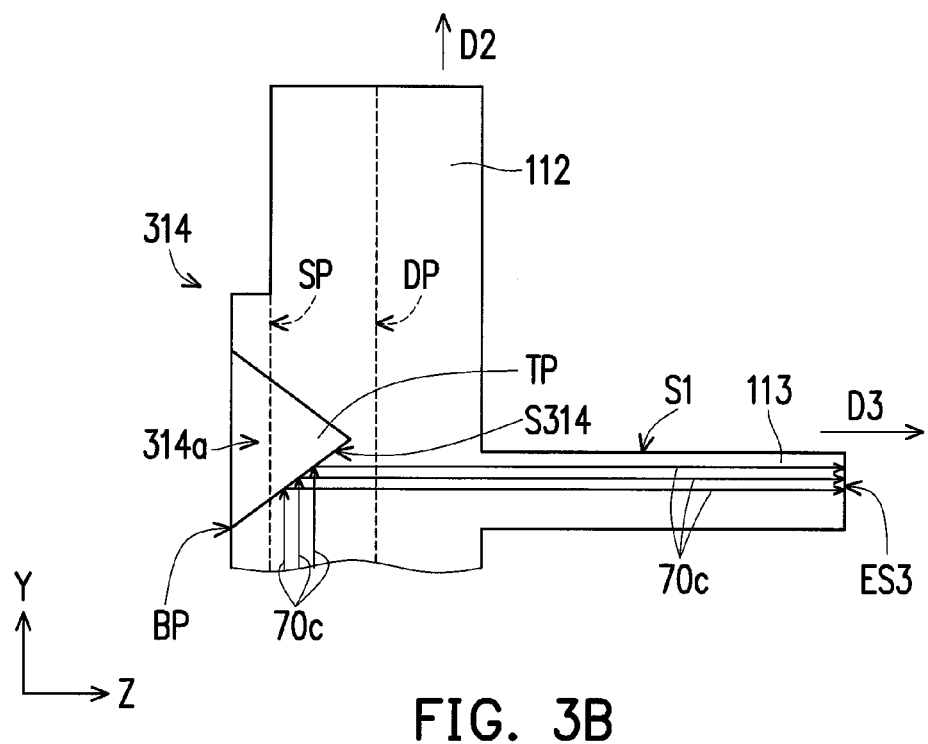
FIG. 3B is a schematic view of light path of part of the light beam exiting through a third light-guiding branch in FIG. 3A.
Figure 3C:
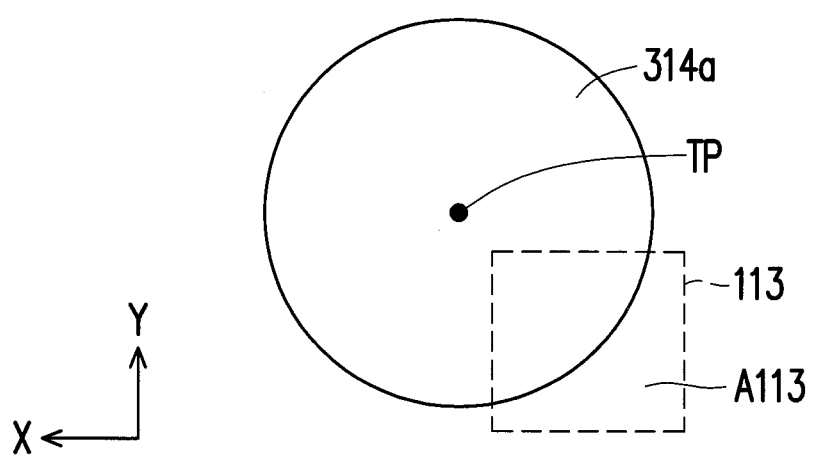
FIG. 3C is a schematic view of a projection region of a recess and the third light-guiding branch on a plane in FIG. 3A.

FIG. 3A is a schematic three-dimensional view of one perspective of a light source module according to another embodiment of the invention. FIG. 3B is a schematic view of light path of part of the light beam exiting through a third light-guiding branch in FIG. 3A. FIG. 3C is a schematic view of a projection region of a recess and the third light-guiding branch on a plane in FIG. 3A. Referring to FIG. 3A and FIG. 3B, in the present embodiment, the light source module 300 in FIG. 3A is similar to the light source module 100 in FIG. 1B and the differences are described below. Specifically, as shown in FIG. 3A and FIG. 3B, in the present embodiment, the recess 314a of the light scattering portion 314 is a conical recess. In other words, the bottom surface S314 of the recess 314a is a conical surface, and the top portion TP of the recess 314a would cross the plane SP (i.e. the conical surface of the recess 314a also intersects the plane SP) in which the first light-guiding branch 111, the second light-guiding branch 112, and the light scattering portion 314 connects. Therefore, it allows the bottom surface S314 of the recess 314a to locate on the transmitting path of part of the light beam 70c. On the other hand, as shown in FIG. 3B and FIG. 3C, in the present embodiment, the projection of a top portion TP of the recess 314a (i.e. center of the bottom surface S314 of the recess 314a) on the X-Y plane would fall outside of the projection region A113 in which the third light-guiding branch 113 projects on the X-Y plane. In addition, the width between the top portion TP of the recess 314a and the boarder BP of the recess 314a in the second direction D2 is larger than the width between a surface S1 of the third light-guiding branch 113 and the boarder BP of the recess 314a in the second direction D2. As such, part of the light beam 70c can be effectively scattered to the third light-guiding branch 113, and other parts of the light beam 70a and 70b can be directly guided to the first light-guiding branch 111 or the second light-guiding branch 112 to exit through the light emitting surfaces ES1, ES2, and ES3 of each of the light-guiding branches 111, 112, and 113. In other words, the light source module 300 also has the multi-axis light exiting function to achieve the advantage and effects similar to that of the light source module 100, and detailed descriptions thereof are not repeated.

Figure 4A:
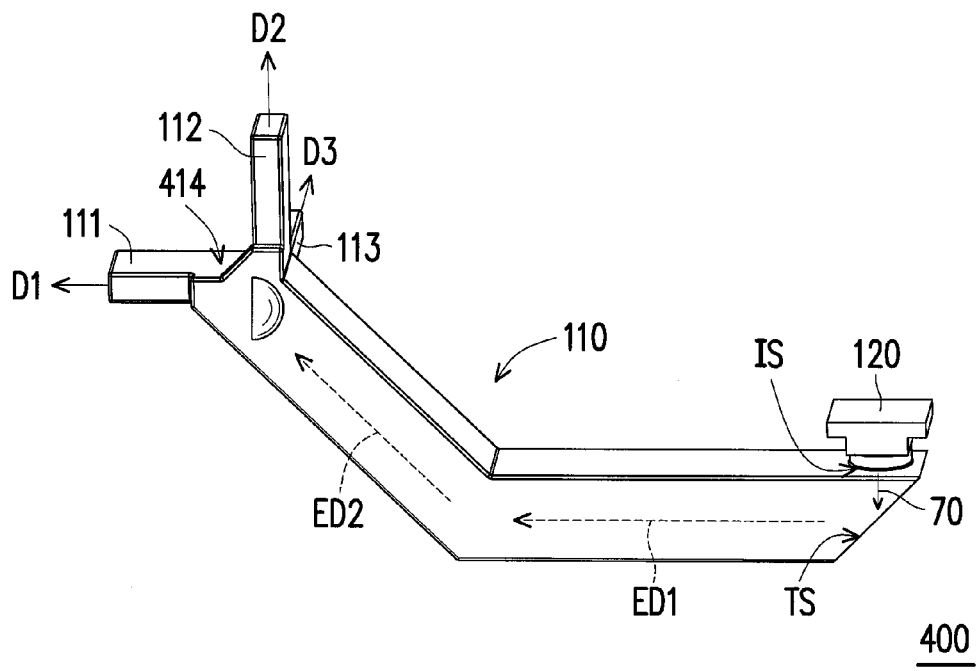
FIG. 4A is a schematic three-dimensional view of one perspective of a light source module according to another embodiment of the invention.
Figure 4B:
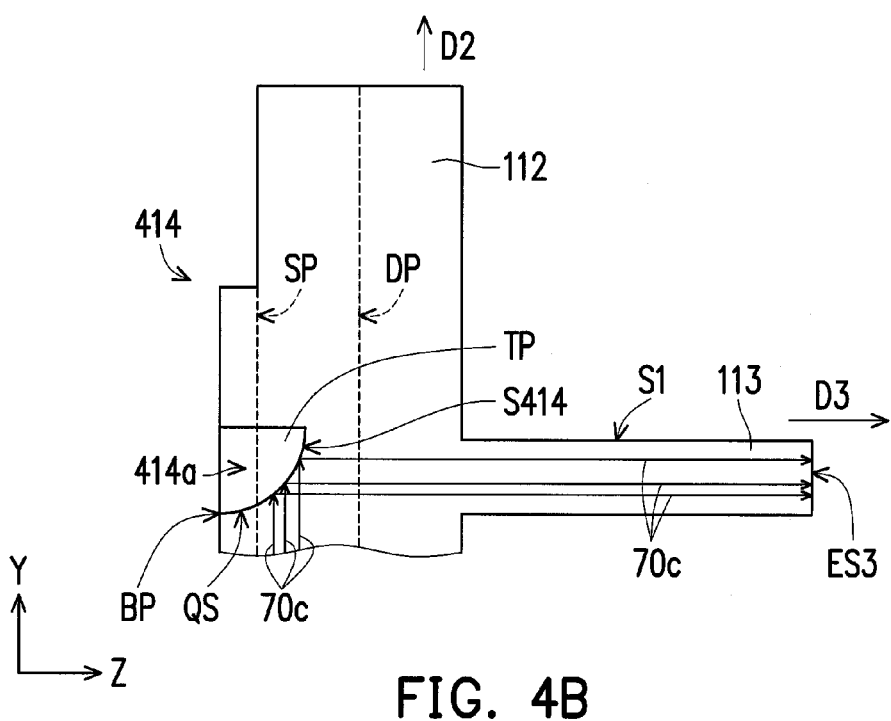
FIG. 4B is a schematic view of light path of part of the light beam exiting through a third light-guiding branch in FIG. 4A.
Figure 4C:
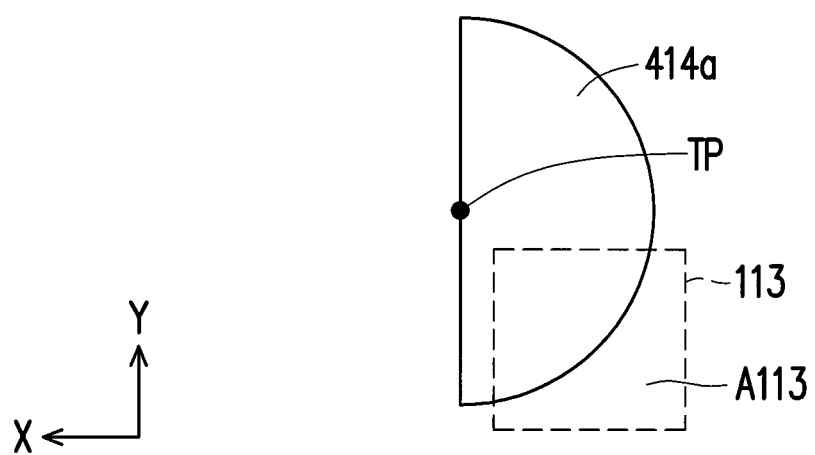
FIG. 4C is a schematic view of a projection region of a recess and the third light-guiding branch on a plane in FIG. 4A.

FIG. 4A is a schematic three-dimensional view of one perspective of a light source module according to another embodiment of the invention. FIG. 4B is a schematic view of light path of part of the light beam exiting through a third light-guiding branch in FIG. 4A. FIG. 4C is a schematic view of a projection region of a recess and the third light-guiding branch on a plane in FIG. 4A. Referring to FIG. 4A and FIG. 4B, in the present embodiment, the light source module 400 in FIG. 4A is similar to the light source module 100 in FIG. 1B and the differences are described below. Specifically, as shown in FIG. 4A and FIG. 4B, in the present embodiment, the recess 414a of the light scattering portion 414 is a quarter of spherical recess. In other words, part of the bottom surface S414 of the recess 414a is a quarter of spherical surface QS, the top portion TP of the recess 414a would cross the plane SP (i.e. the quarter of spherical surface QS of the recess 414a intersects the plane SP) in which the first light-guiding branch 111, the second light-guiding branch 112, and the light scattering portion 414 connects, and the quarter of spherical surface QS would face the direction in which the light enters the light scattering portion 414 to allow the quarter of spherical surface QS of the recess 414a to locate on the transmitting path of part of the light beam 70c. Moreover, as shown in FIG. 4B and FIG. 4C, in the present embodiment, the projection of a top portion TP of the recess 414a on the X-Y plane would fall outside of the projection region A113 in which the third light-guiding branch 113 projects on the X-Y plane. In addition, the width between the top portion TP of the recess 414a and the boarder BP of the recess 414a in the second direction D2 is larger than the width between a surface S1 of the third light-guiding branch 113 and the boarder BP of the recess 414a in the second direction D2.

As such, the light module 400 can also allow part of the light beam 70c to be scattered to the third light-guiding branch 113 effectively, and other parts of light beam 70a and 70b can be directly guided to the first light-guiding branch 111 or the second light-guiding branch 112 to reach the function of exiting through the light emitting surfaces ES1, ES2, and ES3 of each of the light-guiding branches 111, 112, and 113. In other words, the light source module 400 also has the multi-axis light exiting function to achieve the advantage and effects similar to that of the light source module 100, and detailed descriptions thereof are not repeated.

Figure 5A:
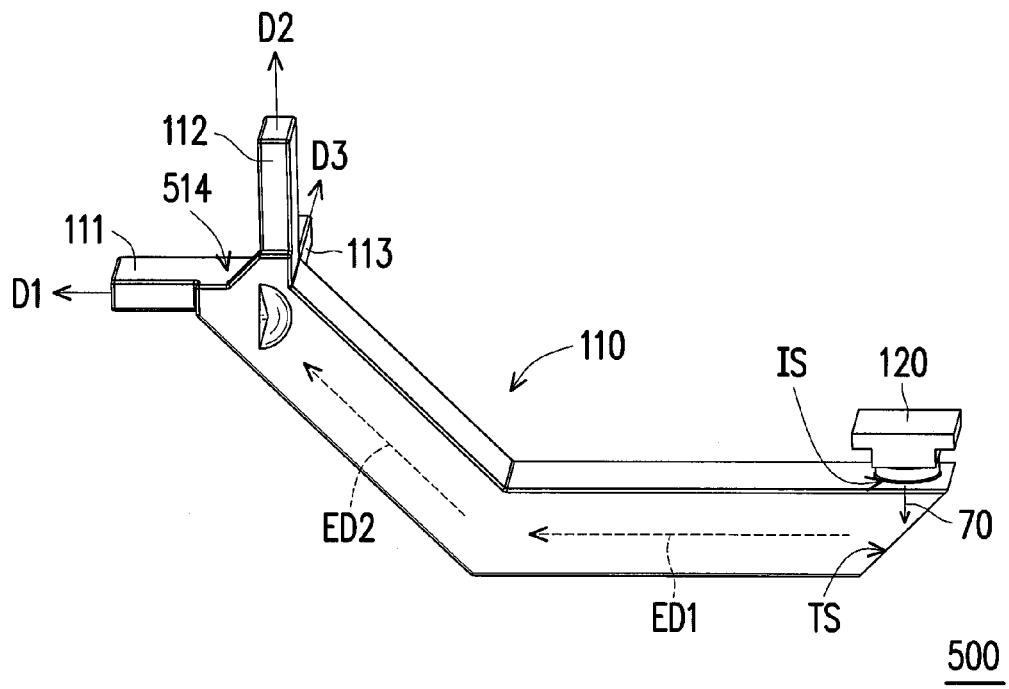
FIG. 5A is a schematic three-dimensional view of one perspective of a light source module according to another embodiment of the invention.
Figure 5B:
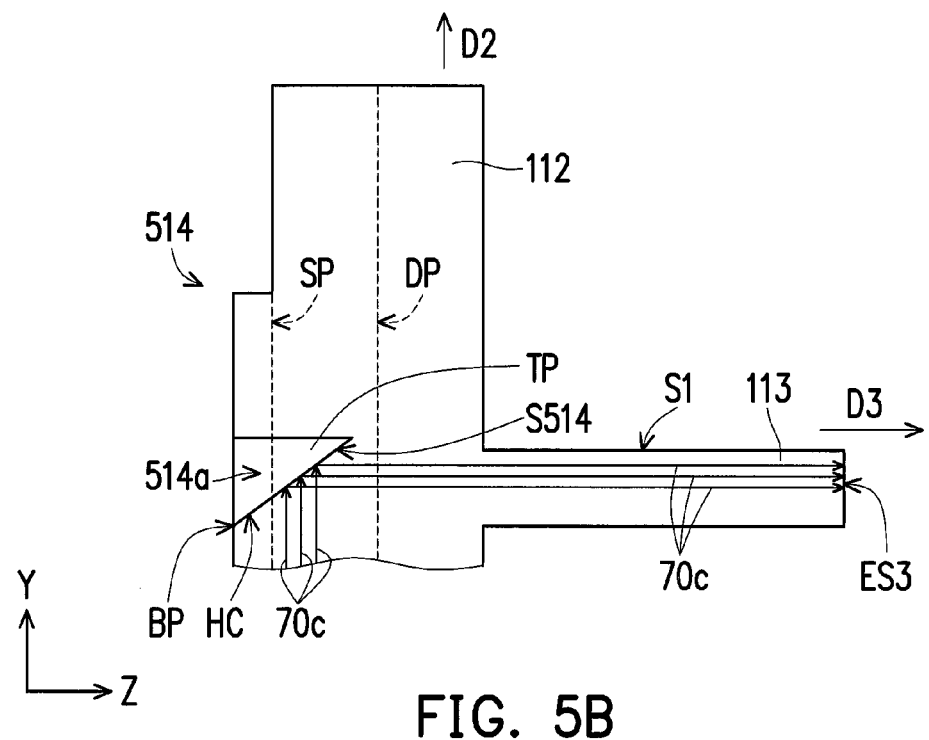
FIG. 5B is a schematic view of light path of part of the light beam exiting through a third light-guiding branch in FIG. 5A.
Figure 5C:
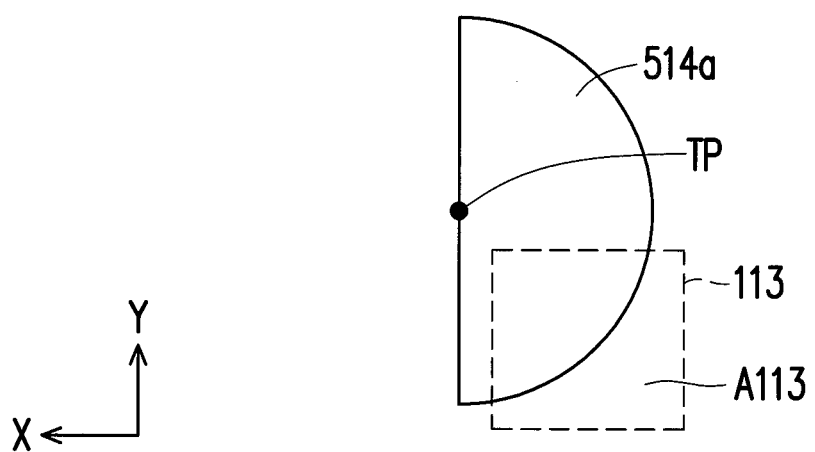
FIG. 5C is a schematic view of a projection region of a recess and the third light-guiding branch on a plane in FIG. 5A.

FIG. 5A is a schematic three-dimensional view of one perspective of a light source module according to another embodiment of the invention. FIG. 5B is a schematic view of light path of part of the light beam exiting through a third light-guiding branch in FIG. 5A. FIG. 5C is a schematic view of a projection region of a recess and the third light-guiding branch on a plane in FIG. 5A. Referring to FIG. 5A and FIG. 5B, in the present embodiment, the light source module 500 in FIG. 5A is similar to the light source module 100 in FIG. 1B and the differences are described below. Specifically, as shown in FIG. 5A and FIG. 5B, in the present embodiment, the recess 514a of the light scattering portion 514 is a half conical recess. In other words, part of the bottom surface S514 of the recess 514a is a half conical surface HC, the top portion TP of the recess 514a would cross the plane SP (i.e. the half conical surface HC of the recess 514a intersects the plane SP) in which the first light-guiding branch 111, the second light-guiding branch 112, and the light scattering portion 514 connects, and the half conical surface HC would face the direction in which the light enters the light scattering portion 514 to allow the half conical surface HC of the recess 514a to locate on the transmitting path of part of the light beam 70c. Moreover, as shown in FIG. 5B and FIG. 5C, in the present embodiment, the projection of a top portion TP of the recess 514a on the X-Y plane would fall outside of the projection region A113 in which the third light-guiding branch 113 projects on the X-Y plane. In addition, the width between the top portion TP of the recess 514a and the boarder BP of the recess 514a in the second direction D2 is larger than the width between a surface S1 of the third light-guiding branch 113 and the boarder BP of the recess 514a in the second direction D2.

As such, the light module 500 can also allow part of the light beam 70c to be scattered to the third light-guiding branch 113 effectively, and other parts of light beam 70a and 70b can be directly guided to the first light-guiding branch 111 or the second light-guiding branch 112 to reach the function of exiting through the light emitting surfaces ES1, ES2, and ES3 of each of the light-guiding branches 111, 112, and 113. In other words, the light source module 500 also has the multi-axis light exiting function to achieve the advantage and effects similar to that of the light source module 100, and detailed descriptions thereof are not repeated.

Accordingly, by disposing the light guide that has at least three light-guiding branches, the light source module of the invention allows light to exit along a plurality of different axes even when only one light source is provided. Therefore, when performing optical design, the amount of light sources can be reduced to achieve the advantages of small volume and low power consumption.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A light source module, comprising:
a light guide, wherein an end of the light guide has a light incident surface, and another end of the light guide has at least three light-guiding branches, the light branches extend along different extending directions and each light-guiding branch respectively has a light emitting surface, wherein the light-guiding branches comprise a first light-guiding branch, a second light-guiding branch, and a third light-guiding branch, the first light-guiding branch extends along a first direction, the second light-guiding branch extends along a second direction, the third light-guiding branch extends along a third direction, the first direction and the second direction are located on a plane, the light guide has a main body and a light scattering portion, and the light scattering portion and the third light-guiding branch are respectively located on both sides of the plane; and
a light source, adapted for providing a light beam, wherein the light beam enters the light guide through the light incident surface and the light beam exits the light guide from the light emitting surface.

2. The light source module according to claim 1, wherein the light scattering portion is disposed next to a connection of the first light-guiding branch and the second light-guiding branch.

3. The light source module according to claim 2, wherein the main body, the light scattering portion, the first light-guiding branch, the second light-guiding branch, and the third light-guiding branch are integrally formed.

4. The light source module according to claim 1, wherein the light scattering portion has a recess, the recess extends toward the third light-guiding branch, and part of the light beam is scattered by the recess and transmits to the third light-guiding branch along the third direction.

5. The light source module according to claim 4, wherein a projection of a top portion of the recess on a plane falls outside of a projection region in which the third light-guiding branch projects on the plane, and the plane is parallel to the first direction and the second direction.

6. The light source module according to claim 4, wherein the recess is a hemispherical recess, a conical recess, a quarter of spherical recess, or a half conical recess.

7. The light source module according to claim 4, wherein a bottom surface of the recess comprises a polished surface.

8. The light source module according to claim 4, wherein the bottom surface of the recess comprises a rough surface.

9. The light source module according to claim 1, wherein the first direction, the second direction, and the third direction are not parallel to each other.

10. The light source module according to claim 1, wherein the first direction, the second direction, and the third direction are perpendicular to each other.

* * * * *